Feb. 11, 1958　　　J. C. SCHWALL　　　2,822,746
COFFEE BREWING MACHINE
Filed May 14, 1954　　　　　　　　　　　5 Sheets-Sheet 1
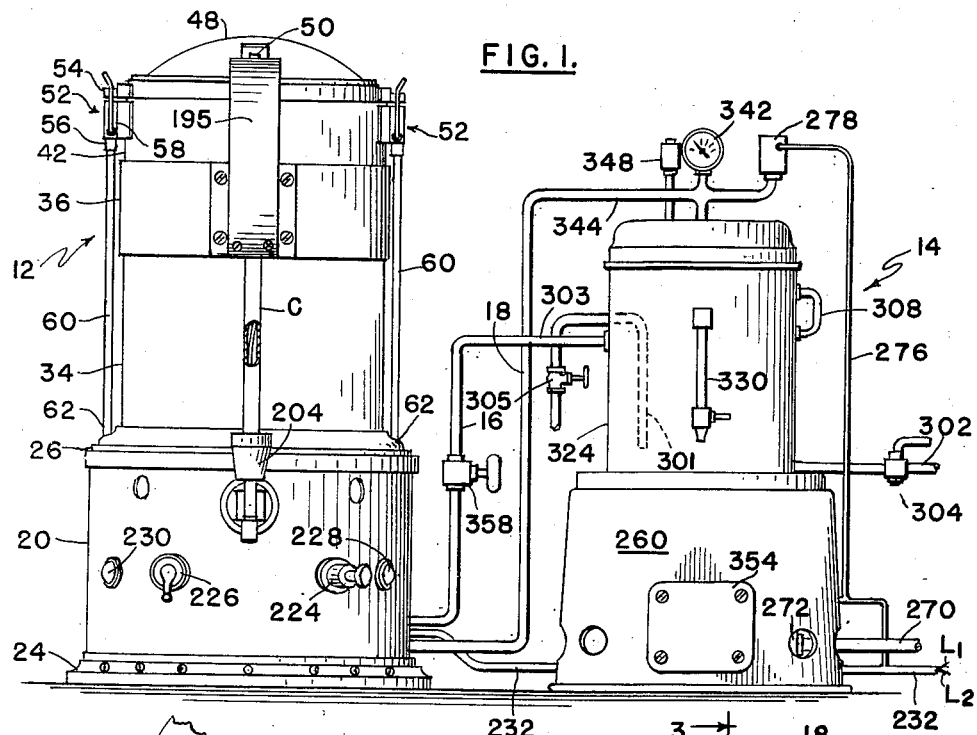
FIG. 1.
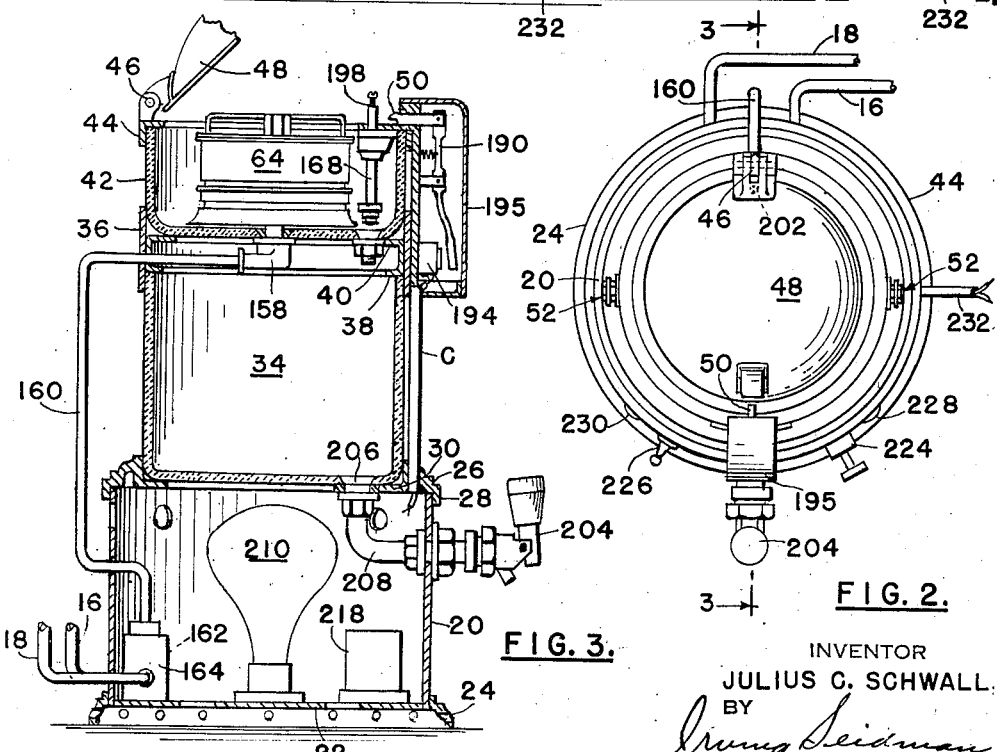
FIG. 2.
FIG. 3.
INVENTOR
JULIUS C. SCHWALL
BY
Irving Seidman
ATTORNEY

INVENTOR
JULIUS C. SCHWALL,
BY
ATTORNEY

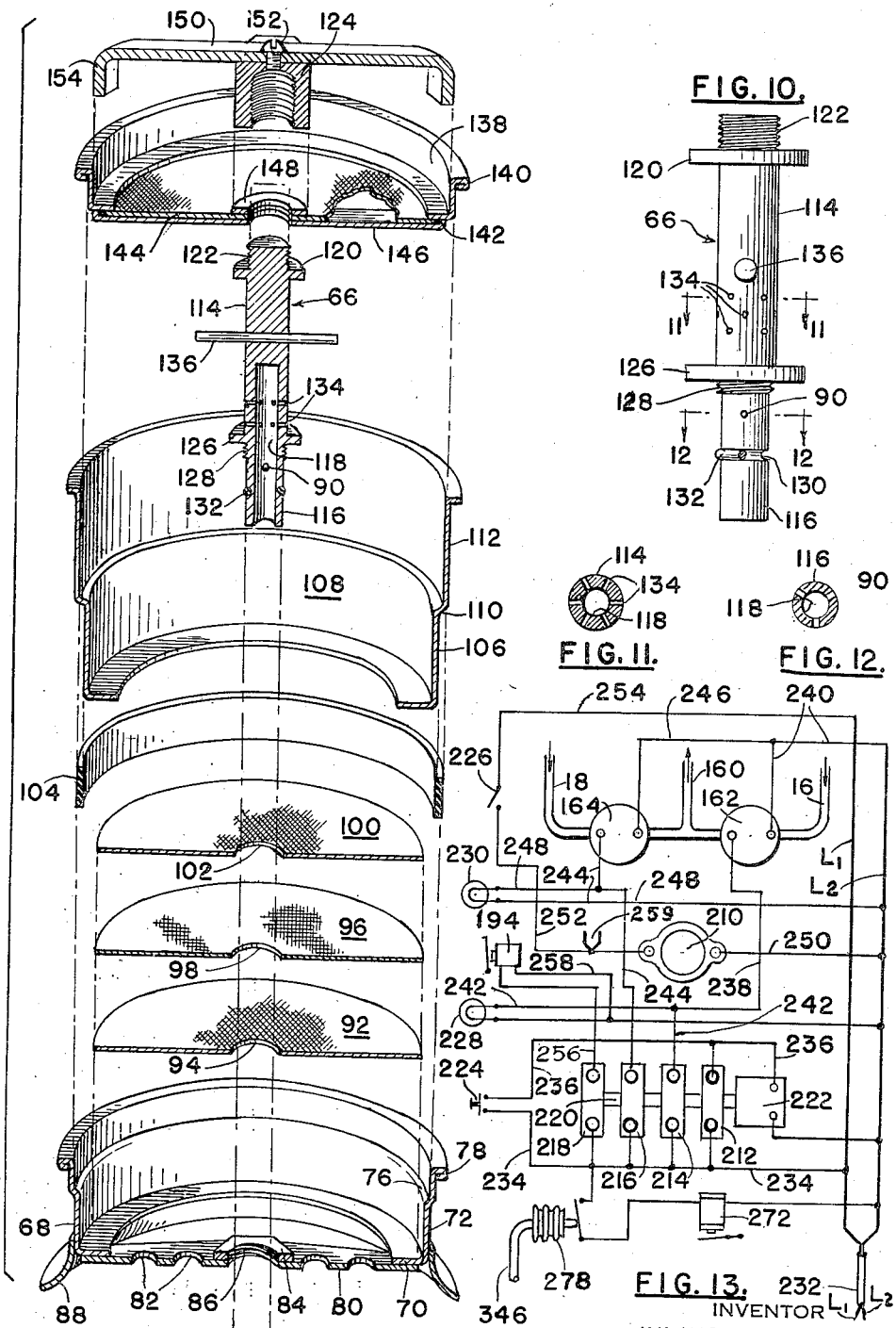

Feb. 11, 1958     J. C. SCHWALL     2,822,746
COFFEE BREWING MACHINE
Filed May 14, 1954     5 Sheets-Sheet 4
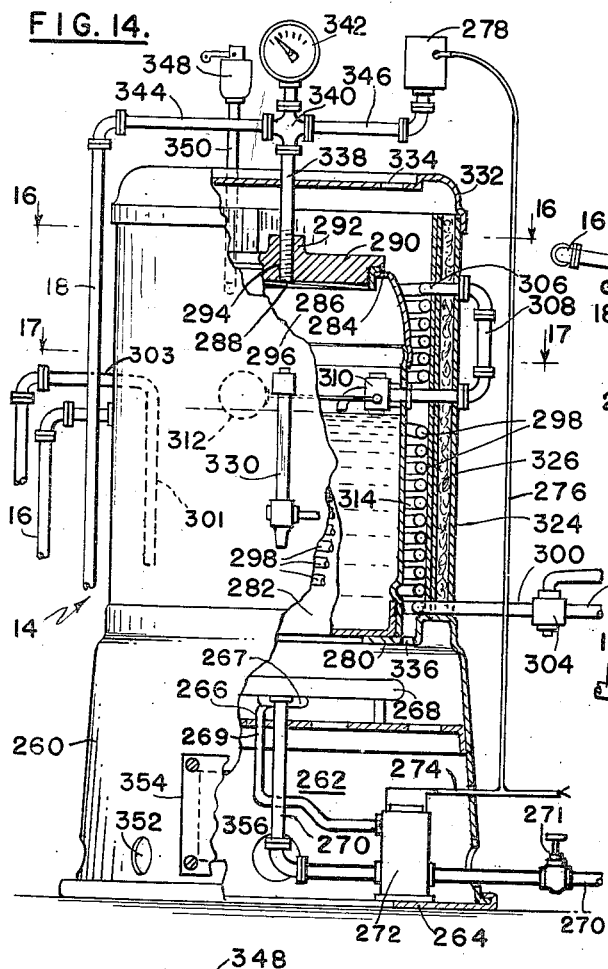
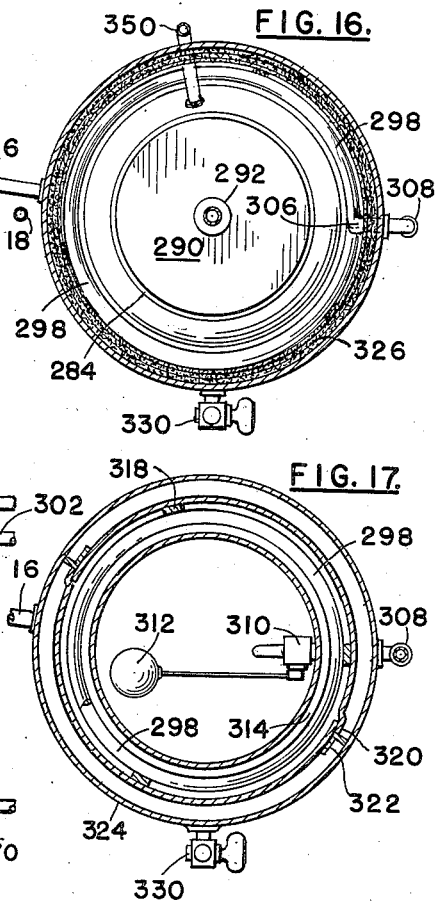
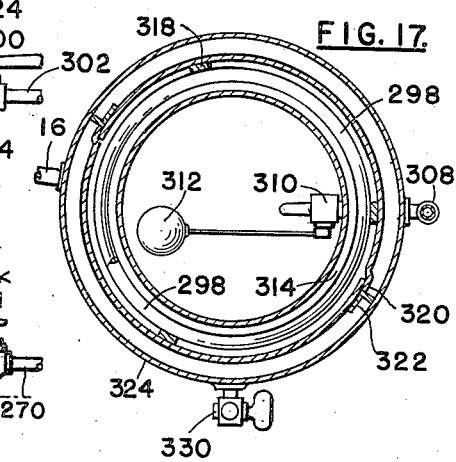
INVENTOR
JULIUS C. SCHWALL,
BY
Irving Seidman
ATTORNEY

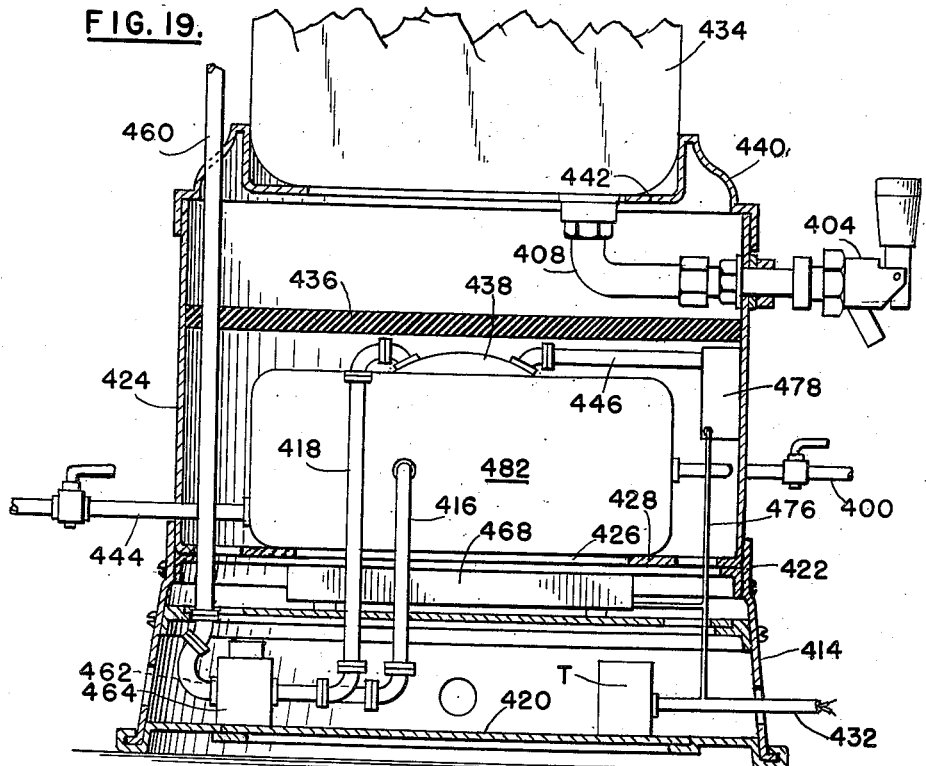
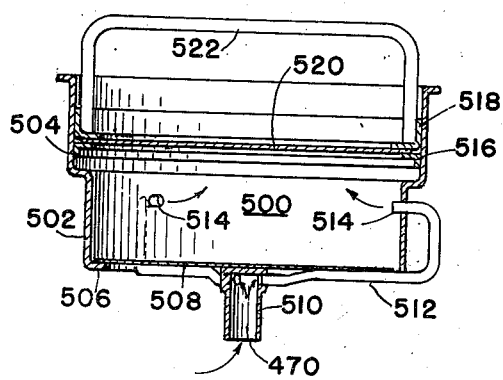

' # United States Patent Office 2,822,746
Patented Feb. 11, 1958

2,822,746

COFFEE BREWING MACHINE

Julius C. Schwall, Brooklyn, N. Y., assignor to Wallin Industrial Corp., New York, N. Y., a corporation Application May 14, 1954, Serial No. 429,741

3 Claims. (Cl. 99—287)

This invention relates to an improvement in coffee brewing machines and has particular reference to a coffee brewing machine of said type wherein I supply a means for constantly agitating the ground coffee in the coffee basket of the brewing machine, while the brewing water passes through the ground coffee.

My present invention is in the nature of an improvement over an application for a coffee machine filed by me on March 11, 1952 and bearing Serial Number 275,899, now Patent No. 2,745,334, issued May 15, 1956.

In most conventional coffee machines, at present in use, and to the best of my knowledge, the ground coffee becomes and remains tightly packed in the coffee basket of the machine thereby preventing the full strength and flavor of the coffee from being drawn out of the ground coffee while the brewing liquid passes therethrough.

The essential object of my invention is therefore to provide a coffee brewing machine in which the ground coffee, while being brewed, is constantly being scattered through the brewing water and kept in agitative condition while the brewing water is passing through the grounds.

Another object of my invention is the provision therein of means for directing jets of stream into the brewing water as it passes through the ground coffee in the coffee basket thereby maintaining the ground coffee in suspension and drawing from same its maximum strength and highly improving its flavor when brewed.

The above objects as well as others and advantages of the present invention will be apparent from the following description and claims.

My present invention comprises essentially what is generally known as an infusion head which consists of a coffee basket positioned in an upper coffee brewing compartment and includes an infusion jet which is centrally located within the coffee basket. Hot water and steam under pressure, are fed to the jet and emitted through needle orifices in the infusion jet and directed into the ground coffee, both below and above the bottom of the coffee basket. The steam entering the coffee basket together with the brewing water will force the ground coffee particles apart and at the same time keep the water in a state of turbulence and the ground particles in agitative suspended position. All the particles of the ground coffee become saturated and extract the maximum amount of flavor.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claim, or of forms that are their functional as well as conjointly cooperative equivalents, are therefore intended to be embraced by those claims.

The invention itself, however, both as to its organization and its method of operation, will best be understood from the following description of a specific embodiment when read in connection with the accompanying drawing, in which:

Fig. 1 is a front elevational view of my coffee machine suitably connected to a hot water and steam generating boiler.

Fig. 2 is a top view of my coffee machine without the boiler.

Fig. 3 is a sectional elevation taken in a plane indicated by line 3—3 of Fig. 2 and shows the cover partly broken away.

Fig. 9 is an exploded view of the infusion head and infusion jet, all shown in sectional perspective.

Fig. 10 is a side elevation of the infusion jet.

Fig. 11 is a sectional plan view taken along the line 11—11 of Fig. 10.

Fig. 12 is a sectional plan view taken along the line 12—12 of Fig. 10.

Fig. 13 is a diagram showing the electrical circuits and operating components of the machine.

Fig. 14 is a front elevational view of the hot water and steam generating boiler and shows a part of the wall of the boiler broken away to disclose its interior.

Fig. 15 is a top or plan view of Fig. 14.

Fig. 16 is a sectional plan view taken along the line 16—16 of Fig. 14.

Fig. 17 is a sectional plan view taken along the line 17—17 of Fig. 14.

Fig. 18 is an enlarged fragmentary plan view, in section, of a part of Fig. 17.

Fig. 19 is a sectional view of the lower portion of a coffee machine and discloses a modified form wherein the hot water and steam generator is made a part of the coffee brewing machine.

Fig. 20 is a sectional view of a modified form of infusion head, and

Fig. 21 is a plan view of same partly broken away and having the upper portion removed.

Figure 4:
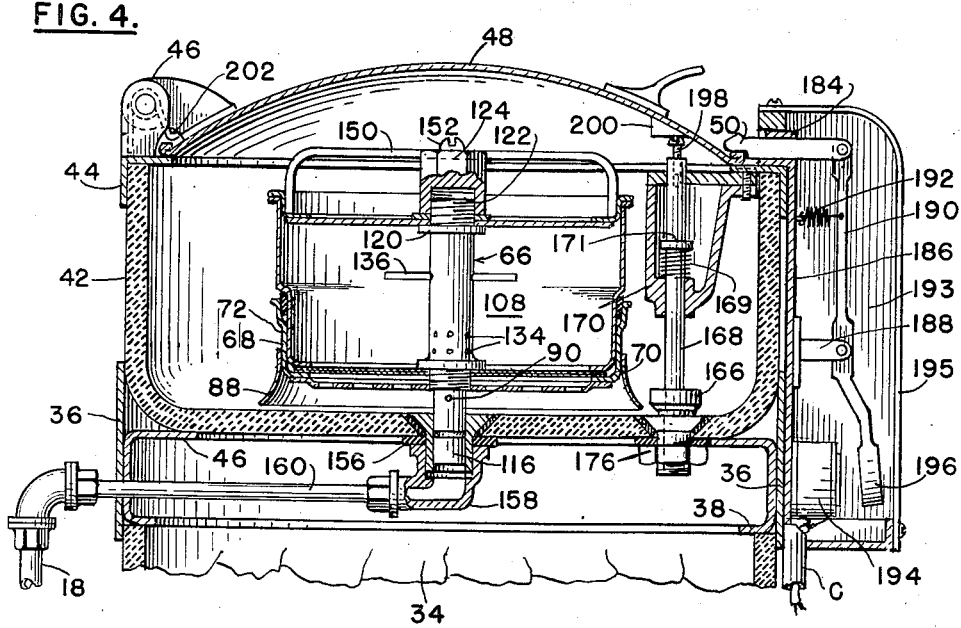
Fig. 4 is an enlarged cross sectional elevation of the coffee brewing chamber and the infusion head located therein. (The lower portion of the coffee machine being broken away).

Referring now to the parts in detail wherein similar reference numerals refer to similar parts throughout, 12 designates, in general a coffee brewing machine and 14 a hot water and steam generator which is connected to the coffee machine by means of a hot water line 16 and a steam supply line 18 respectively.

The coffee brewing machine 12 comprises a base compartment member 20, open at its top and having a bottom 22, the said base compartment being provided to house various operating and controlling units which will be hereinafter fully described. An annular base ring 24 is secured to the base member and raises the bottom 22 slightly above a table top or stand. An annular connecting member 26 having a depending rim 28 rests upon the upper or open end of the base compartment member 20 and has an inwardly extending flange 30 which is adapted to form a seat for the bottom 32 of a heat resistant glass jar 34 which jar functions as a storage compartment for brewed coffee. An annular band 36, having lower and upper inwardly extending flanges 38 and 40 respectively, rests upon the upper open end of the said storage jar 34 and provides a seat, upon the flange 40 for a second smaller glass jar 42. The said glass jar 42 provides the coffee brewing compartment of the machine. Around the top of said jar 42 there is arranged a flanged ring capping member 44 to the top of which there is pivotally attached, as at 46, a domed cover 48 which is held in closed position by a latching means 50 (Figs. 3 and 4), to be hereinafter fully described.

Figure 7:
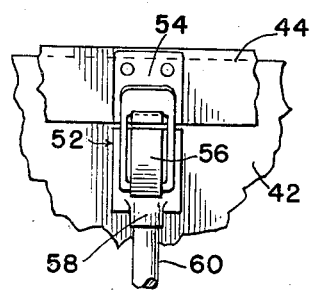
Fig. 7 is a view of a snap clamp provided to hold the machine parts together.
Figure 8:
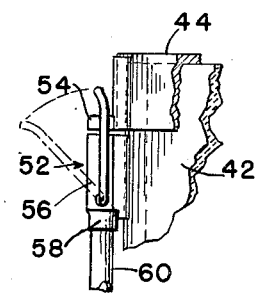
Fig. 8 is a side view of same.

When the parts above described are fitted together they are held in place by a pair of spring clamps 52 (Figs. 1, 7 and 8) the upper portion 54 of which is secured to the capping ring 44 while the lower or locking part 56 is attached to the upper ends 58 of a pair of standards 60 secured at their lower ends 62, to the annular connecting ring 26 upon the top of the base member 20.

The description which now follows concerns the infusion head 64 seated within the coffee brewing jar 42 and an infusion jet 66 within the infusion head which form the essential features of my present invention. The infusion head comprises (Figs. 4 and 9 to 12 inclusive), a base member 68 having an inwardly extending flange 70 upon the lower end of a side wall 72 which side wall 72 has a broadened side wall 76 to form a slight ledge 76 and an upper lapped-over end 78. A flat cross band 80 having orifices 82 is welded or otherwise secured to the under side of the flange 70 and has a centered block 84 welded or otherwise secured to the said cross band 80 and through said block 84 and band 80 there is provided a threaded orifice 86. To the outer, lower end of the wall 72 there is attached, by suitable means, an outwardly and downwardly extending ring member 88 which functions as a baffle to hot water and steam as it enters through parts 90 formed in the lower end of the infusion jet and which will be further on more fully described.

A lower perforated filtering disk 92 having a central opening 94 rests (when the parts are assembled) upon the flange 70; upon the disk 92 there rests a filtering fabric or cloth 96 also having a central opening 98. Over the disk 96 there rests a second and upper perforated filtering disk 100 which also has a central orifice 102. The following or next procedure is the attachment of a resilient band 104 upon the lower wall 106 of a ground coffee containing member 108. The said band 104 is forced up against the side wall 106 until it rests under an offset 110 formed by the extended upper wall 112. With the resilient band 104 in place, the ground coffee compartment member 108 is brought down and into the base member 68 against the perforated filter disks 100 and 92 and the interposed filter cloth 96. The resilient band 104 is jammed in place in the offset upper portion of the base member 68 as is clearly shown in Fig. 4 and provides a seal at that point.

The infusion jet 66, hereinbefore mentioned, may now be placed in position. Before placing same in place I will describe this element in detail. The infusion jet already indicated by the reference numeral 66 (Figs. 4, and 9 to 12 inclusive), consists of a bar having an upper solid portion 114, a contracted lower portion 116 and a central bore or channel 118 which extends part way into the infusion jet 66. An upper shoulder 120 is formed near the upper end of the infusion jet and from the shoulder 120 to the extreme upper end of the infusion jet the same is formed with an external thread 122 over which a nut 124 is eventually secured as will be presently explained.

Near the lower part of the upper wider portion of the infusion jet there is provided a second lower shoulder 126 and directly below said shoulder the jet is formed with a threaded portion 128, which threaded portion engages within the internal threaded part 86 of the orifice in the block 84 when the infusion jet is connected at that point. This procedure, it will be observed, ties together the perforated filter disks 92 and 100, the interposed filter cloth 96 and the base member 68, the shoulder 126 engaging against the disk 100. Upon the contracted portion 116 of the infusion jet there is formed an annular groove 130 within which a ring shaped gasket 132 is held. This gasket functions as a seal and will be later explained. Ports 90, heretofore mentioned are provided in the lower contracted portion 116 of the jet and lead from the bore or channel 118 to a space in the coffee brewing chamber just below the perforated disk 92 of the infusion head (Figs. 4, 9 and 10). The lower part of the upper portion 114 of the infusion jet is provided with two rows of orifices 134 which lead from the bore 118 directly into the ground coffee compartment 108.

When the lower end 116 of the infusion jet is passed through the orifices 102, 98 and 94 of the perforated disks 100 and 92 respectively and the orifice 98 of the interposed filter cloth 96, then through the threaded orifice 86 of the block 84, the jet is screwed into the threads 86, the parts mentioned are held tightly together and form a single unit which may be drawn out and removed from the machine. To facilitate this removal a hand-bar 136 is provided for gripping the infusion head. There now remains a cover member which is attached to the upper end of the infusion jet and comprises a rim member 138 which is formed with an upper outwardly extending flange 140 and a lower inwardly extending flange 142 to the under side of which there is secured a perforated disk 144 and over this disk 144 there is provided a cross band 146 which is secured at its ends, to the said perforated disk 144. The band 146, perforated disk 144 and a washer 148 which is secured to the upper side of said perforated disk 144, have concentric openings which engage over the threaded end 122 of the infusion jet and are held down against the shoulder 120 by means of the nut 124 which engages the threads 122. When the cover is thus held in place, the side wall 138 of same, engages with the upper end of the ground coffee compartment 108. A second handle member 150 is attached to the nut 124 by means of a screw 152 and has turned down ends 154 which slidably engage with the side wall 138. With all the parts attached as above described the entire assembly may be withdrawn from the machine and be replaced by a fresh assembled unit or infusion head.

The lower end 116 of the infusion jet 66 extends downwardly through a bushing 156 (Fig. 4) which is sealed in the bottom 40 of the jar 42 and has a threaded end which extends through the bottom 40. A pipe connecting elbow member 158 is screwed over the bushing and holds it sealed upon the bottom of the jar 42. A pipe line 160 is connected to the elbow member 158 and extends radially to and through the band 36, from whence it leads from a T joint between two solenoid operated valves 162 and 164 respectively. See Fig. 3, and diagram of Fig. 13. (All of the component operating parts are not shown in Fig. 3 but are relatively placed in the electrical circuit diagram of Fig. 13.) One leg of the T joint connects with the solenoid 162 which controls the hot water supply to the pipe line 160 while the opposite leg of the T joint connects with the solenoid 164 which controls the steam supply to same pipe line 160. The lines 16 and 18 heretofore mentioned are supply lines leading hot water and steam respectively from the boiler 14 to the said solenoids 162 and 164 respectively.

Figure 5:
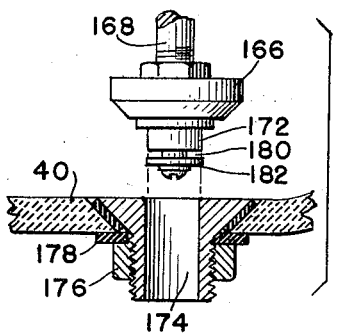
Fig. 5 is a fragmentary detail, in section, of a valve for allowing the brewed coffee to pass into a reservoir for the brewed coffee and is shown in open position.
Figure 6:
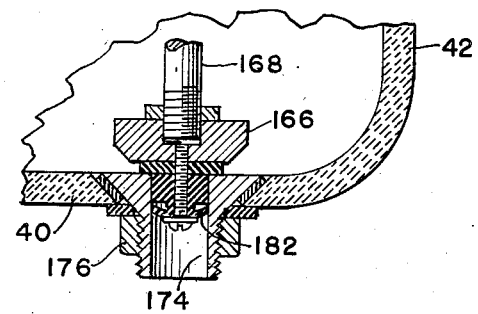
Fig. 6 is a similar view but shows the valve in closed position.

When the said solenoids 162 and 164 are open, hot water and steam are allowed to pass into the pipe line 160, through the elbow 158, into the channel 118 of the infusion jet 66, out through the ports 90 and 134 into the space below the perforated disk 92 and to the ground coffee compartment 108. The hot water saturating the ground coffee and the steam separating the ground coffee particles keeps them all in a constant state of agitation while the water and steam flow through the lines. The perforated disk 144 in the cover member permits steam under excessive pressure to pass out of the infusion head and into the coffee brewing jar 42. As the coffee is brewed it settles in the brewing jar 42 from whence it is passed into the coffee reservoir 34 through a plunger valve 166 mounted upon the lower end of a reciprocally moving rod 168, slidable in a bracketed bearing member 170 (Figs. 4, 5 and 6). The said action occurs at the completion of a brewing cycle. The plunger valve 166 has a button type resilient member 172 which is adapted to engage within a bushing 174 which is sealed to and securely held upon the bottom 110 by means of a nut 176 and gasket 178. The bottom of said button 172 is annularly grooved as at 180 to form an annular projecting lip 182 which is deformed as it enters the bushing 174 to make a tight seal when the plunger valve 166 is down to closed position as shown in Fig. 6.

The plunger valve 166 and its connected rod 168 are normally held in their lowermost closed valve position by the pressure upon the rod's upper end when the cover 48 is in closed position (Fig. 4), and held thus by the hereinbefore mentioned latch 50. The said latch 50 is slidable through an opening 184 at the top of a plate 186 which is secured to the aforesaid capping ring 44 and to the annular band 36 and has secured to it a bracket 188 to which there is pivotally attached a rod 190, the upper end of which is slidably and pivotally attached to one end of said latch 50. A spring 192, disposed between the plate 186 and rod 190, is adapted to urge the latch 50 into its locking position (Fig. 4). To release the said latch there is provided an electro-magnet element 194 which, when electrically energized, attracts the lower enlarged end 196 of the rod 190. A housing 193, having a cover plate 195, is secured to the plate 186 and encloses the latch mechanism. A conduit C carries a current conductor to the current supply line. The upper end of the rod 190 is provided with an adjusting screw 198 which is adapted to engage against a ledge 200 formed upon the under side of said cover 48. When the latch is drawn back by the energized electro-magnet 194, the rod 168 rises, due to the urge of spring 169, disposed upon the rod 168, between a shoulder 171 and the base of the bracket 170. After its release from the latch 50, the cover 48 continues to rise, due to the urge of the spring 202 upon the hinge 46.

A spigot 204 secured to and through the wall of the lower or base compartment 20, connects with a bushing 206 and elbow 208, affords a means for drawing brewed coffee from the storage jar 34. The base compartment 20 provides a housing for a heater lamp 210, secured to the bottom 22 of base compartment. A pair of solenoid operated valves 162 and 164, previously mentioned are also located upon the bottom 22 as is also a timing switch unit having timer disks 212, 214, 216 and 218 which are all mounted upon a single shaft 220 and driven by a motor 222 all of which are shown on the diagram of Fig. 13.

A push-button switch 224 is provided upon the wall of the base compartment 20, as is also a toggle switch 226, and red signal and green signal lights 228 and 230 respectively (Figs. 1 and 13). Referring now to the diagram of Fig. 13, it will be noted that an electrical conductor cable 232 supplies current from its source (not shown) and consists of lines $L_1$ and $L_2$ which are connected by branch lines to the various component parts for operating the machine. The line $L_1$ leads, through a branch line 234, to the normally open, spring actuated push button switch 224, then through line 236 to the motor 222 and time switch 212 to start the motor. The timers 212, 214, 216 and 218 are all connected by short branch lines to the line 234 and the rotation of the motor rotates all of said timers. As the motor rotates, the timer T by-passes the current to the motor 222 through its connection with the branch line 236 and maintains the current to the motor during the cycle of operation and at the same time the timer 214 directs a current flow through a branch line 238 and 240 to the line $L_2$ to energize the solenoid 162 which opens valve connected with said solenoid and allows hot water from the line 16 to pass into the riser line 160 which leads to the infusion jet 66. At the same time a branch line 242 directs current through the green signal light 228 and to the line $L_2$ and illuminates said light to indicate that hot water flows through pipe line 160 to the said infusion jet. When the signal light 228 glows, the pressure upon the push button switch 224 is released and the cycle of current flow proceeds until completion of the operation cycle. Co-acting and in unison with the timer disk 214, the timer disk 216 closes a circuit through the branch line 244 to the solenoid operated valve 164 and through line 246, thereby allowing steam from the pipe line 18 to flow to the pipe line 160 and up to the infusion jet 66. At the same time a branch line 248, from the line 244 leads current to the signal light 230, and from the signal light to line $L_2$, illuminating the said signal light to indicate a steam flow to the infusion jet 66.

The timer disk 218 controls the energization of the electro-magnet 194 which in turn operates to release the said cover 48 and opens valve 166 to allow brewed coffee to flow into the storage jar 34, and comes into action upon the completion of a cycle of operation. The current line to the electro-magnet 194 extends from the timer disk 218, through the lines in the conduit C (lines 256 and 258), and is connected in series to line $L_2$. A lamp 210, preferably an infra-red lamp, is mounted upon the bottom 22 of the base compartment 20 and provides a means for maintaining the brewed coffee in the storage compartment 34 at a fixed temperature. The said infra-red lamp 210 is energized by a current flow which passes through a branch line 250 from $L_2$, through line 252 to toggle switch 226 and through line 254 to line $L_1$. The said lamp is controlled by said toggle switch and may be provided with a thermo-control switch 259 which will open the circuit when the lamp reaches a fixed high temperature.

In the diagram of Fig. 13, there is included an auxiliary circuit to energize a solenoid operated gas valve and has in the circuit an electro-switch which is actuated by a vapor actuated bellows which is provided to control the steam pressure, all of which will be hereinafter fully described in connection with the description of the hot water and steam generator or boiler.

The generator, shown as a part of Fig. 1, and in detail in Figs. 14 to 18 inclusive, comprises a base section 260 forming a compartment 262 having a partially open bottom 264 and an orificed shelf 266 upon which there rests a circular type gas burner 268. A gas supply pipe 270 connects with a burner 268 and leads from a regulation gas source. Interposed in the gas supply line, there is a solenoid operated gas valve 272 which is electrically connected into the lines $L_1$ and $L_2$ of the conductor cable 232 hereinbefore mentioned, by means of a two wire conductor 274. Connected in series to one of the wires of the said two wire conductor 274 there is a second two wire conductor 276 which leads to an electro-switch 278 which is actuated by means of a steam pressure bellows as will be described further on.

The upper portion or edge of the base section 260 is formed with an inwardly extending annular flange 280 upon which rests a water tank 282 having a contracted open upper end with an inwardly turned annular flange 284, upon which rests an annular ring member 286 formed with an internal thread 288. Into the said thread there is screwed a cap or top plate 290 formed with a central base 292 and an internally threaded base 294. The contracted upper portion 296 of the tank forms a dome for the steam as it is generated. Surrounding the tank 282 there is a series of coils of tubing 298 having a water inlet 300 which connects with a water inlet pipe 302 in which there is disposed a valve 304. The water outlet from the coils is at the upper coil through the connection 306 into the pipe line 308 and thence into the tank 282 through a valve 310 which is operated by a float 312 adapted to maintain the water in the tank at a predetermined level. Hot water leaves the tank through the outlet pipe 16 and is led through this pipe to the solenoid operated valve 164 in the coffee brewing machine.

The water coils 298 are continuous and spaced away from the tank wall a short distance as at 314 and is best shown in Fig. 14 and enlarged fragmentary section of Fig. 18. Surrounding the coils and spaced slightly away from same there is a sleeve 316 which is spaced from the coils by not less than three vertical ribs 318 (Figs. 17 and 18). The sleeve 316 is made up in two sections which are connected by vertically lapped joints 320. Vertical flanged members 322 are secured to the sleeve and provide spacers against which a wall 324 forming a housing, engages. The space between the housing wall 324 and the sleeve 316 is packed with mineral wool 326 or other suitable heat insulating material as indicated in Figs. 14 and 16 but omitted in Figs. 17 and 18. In the vertical flanged members 322 there are at least three orifices 328 to allow air circulation. To the front of the housing and having connection with the interior of the tank there is a regulation water gauge 330. The housing 324 is topped with a cover member 332 which is provided with air vent orifices 334. The bottom flange 280 is provided with orifices 336 for the passage of hot air from the burner 268 up and around the coils 298 and are adapted to pre-heat the water as it passes through the coils before entering the water tank 282.

A short pipe line 338 extends upwardly from the cover plate 290 and terminates at a four way pipe joint 340 and to the upper port of said four way pipe joint there is attached a steam pressure gauge 342. A pipe line 344 connects the four way joint with the steam supply line 18 which in turn is connected to the solenoid operated steam valve 164 in the coffee brewing machine. A pipe line 346 connects the four way joint to the bellows operated electro-switch 278. A safety valve 348 is connected by pipe line 350 to the hot water tank 282 and leads from the dome 296 (Figs. 14 and 16). Vent openings 352 are provided in the base section 260. A plate 354 provides a cover over an access opening 356 in the said base section 260. A valve 358 may be provided in the hot water line 16 between the generator 14 and the coffee machine 12. The gas line 270 to the generator may be supplied with a manually operated cut off valve (not shown).

In operating the coffee brewing machine, the cycle begins when hot water at five pounds pressure, flows into the infusion chamber at the rate of one-half gallon per minute. The hot water flow is from the generator to the coffee brewing machine, through the solenoid valve, into the riser pipe line to the infusion jet in the infusion head. The hot water leaves the generator at 212° but cools to a temperature of 210° when it reaches the infusion chamber.

Following the hot water flow, steam from the generator flowing through a solenoid valve in the coffee brewing machine, reaches the infusion jet in the infusion head by passing through the same riser line through which the hot water flows. The steam maintains the water constantly at 210° through the coffee brewing period while at the same time agitating the water and ground coffee particles.

The water and ground coffee agitation thus created extracts the maximum amount of flavor from a fixed amount of coffee.

The involved cooling feature eliminates any direct heat from the infusion chamber and thereby prevents the extraction of the natural oils from the ground coffee particles.

In Fig. 19 there is shown a modified embodiment of my invention in which the hot water and steam generating unit is made a part of the coffee brewing machine. In this said embodiment a base member 414, having a removable bottom 420 and an open upper end, rests upon an annular inwardly extending ledge 422 upon the said base member. The said ledge 422 provides a support for an upper base section 424 which has an open bottom 426 and is formed with an annular ledge 428 adapted to support a tank 482. Above the said tank and spaced from it, there is provided a heat retarding plate 436 of asbestos or other suitable material, which allows sufficient heat to reach the bottom of the coffee reservoir 434 and maintain the brewed coffee therein at a desired temperature. The said coffee reservoir 434 is seated upon a ledge 442 which is formed upon a joiner ring 440 adapted to engage over the open top of the upper compartment section 424. A spigot 404 and elbow pipe 408, connected to the bottom of the reservoir 434, provides a means for drawing off brewed coffee, and is similar to that heretofore described.

Water is fed to the tank 482 through the supply line 400. Heated water passes from the tank 482 through the pipe line 416 to a solenoid operated valve 462 located in the base member 414 and from there passes up through the riser 460 to the infusion jet 66 of the infusion head, as has been heretofore set forth. The top of the tank 482 is formed with a steam dome 438. A pipe line 418 directs steam to a second solenoid operated valve 464 also located in the said base member 414, and from the valve 462 enters the riser 460 to the infusion jet 66. A short pipe line 446 connects with a vapor pressure bellows to operate an electro-switch within the housing 478. The switch therein is electrically connected, by means of a conductor 476 which is in turn connected, in series, to the current supply conductor 432. The said current supply conductor 432 supplies current to a timer unit T and motor (not shown) for actuating the said timer unit. The solenoid operated valves 462 and 464 are electrically connected with the said timer unit T. A pipe line 444 supplies a means for drawing off water from the tank 482.

In Figs. 20 and 21 I show a modified form of infusion head. In the said modified form a ground coffee container or basket 500 has a lower contracted portion formed by the side wall 502 and an upper broadened portion formed by the side wall 504. The lower edge of the coffee basket 500 is formed with a ledge 506 upon which there is attached a perforated disk 508 and secured to the under side, at the center of the said disk, is a channel section 510 closed at its top but open at its bottom. To the said channel 510 there is attached and radiating therefrom, tubes 512 which are turned into the wall 502 of the coffee basket 500 and terminate in spouts 514. Seated upon a ledge 516 secured to the wall 504 of the upper broadened portion, is an angular ring member 518, to the bottom of which there is secured a perforated disk 520. The ring 518 is removable from its seat upon the ledge 516 and to facilitate its removal there is provided a cross bar 522 which functions as a handle.

Steam and hot water enters the tubular portion 510 from whence it flows through the tubes 512 and emits through the spouts 514 into the coffee basket 500. In this form the spouts 514 replace the infusion jet 66 of the previously described infusion head.

A syphon 301, having connection with a draw-off pipe 303, is provided for emptying the water tank 282 and is provided with a shut-off valve 305.

A pilot light 267 is provided upon the gas burner 268 and is supplied with gas through a branch line 269. The gas supply line 270 is provided with a shut-off valve 271.

The above described machine may readily be used for brewing tea and the like.

I claim:

1. In a coffee brewing machine comprising a base member, a brewed coffee container supported on said base member, a coffee brewing container closing the open upper end of said brewed coffee container, and means securing said base member and said containers together as a unit; the improvement comprising a ground coffee jar having a perforated bottom wall with a substantially central opening; filter disk means seated on said bottom wall and having apertures aligned with said opening; a tubular fusion jet threaded through said bottom wall and having a radial flange clamping said filter disk means thereagainst, said jet having a closed upper end and radial ports below said bottom wall and above said filter disk means; the open lower end of said jet extending in fluid-tight relation through an opening in the lower wall of said coffee brewing container and supporting said jar above such lower wall; a fluid feed line connected to the lower end of said jet; a hot water line; a pressure steam line; means in said base member controllably establishing communication between said water and steam lines and said feed line for radial discharge of hot water and steam into the ground coffee in said jar and the brewing coffee in said coffee brewing container beneath said bottom wall; and valve means controlling flow of the brewed coffee into the brewed coffee container.

2. The improvement claimed in claim 1 in which the side wall of said jar has depending baffle means extending toward such lower wall.

3. The improvement claimed in claim 1 in which a perforated cover for said jar is secured against a flange on the closed end of said jet for flow of coffee saturated steam therethrough into said brewing container.

References Cited in the file of this patent
UNITED STATES PATENTS

| | | |
|---|---|---|
| 389,079 | Huff | Sept. 4, 1888 |
| 865,776 | Georg | Sept. 10, 1907 |
| 1,317,717 | McKenney | Oct. 7, 1919 |
| 1,535,769 | Gallardo | Apr. 28, 1925 |
| 1,882,247 | Levings | Oct. 11, 1932 |
| 2,014,325 | Grilli | Sept. 10, 1935 |
| 2,088,966 | Lyons | Aug. 3, 1937 |
| 2,216,738 | Felix | Oct. 8, 1940 |
| 2,240,721 | Selitzky | May 6, 1941 |
| 2,296,607 | Gair | Sept. 22, 1942 |
| 2,493,932 | Swanson | Jan. 10, 1950 |
| 2,565,235 | Johnson | Aug. 21, 1951 |
| 2,745,334 | Schwall | May 15, 1956 |

FOREIGN PATENTS

| | | |
|---|---|---|
| 555,855 | Germany | July 29, 1932 |